Sept. 17, 1963   P. T. KAESTNER ET AL   3,104,348
DIFFERENTIAL MOTOR DRIVE FOR RATE DETERMINING SYSTEM
Filed July 1, 1957   3 Sheets-Sheet 1

INVENTORS
PAUL T. KAESTNER
BY FRED B. MacLAREN

Louis L. Gagnon
ATTORNEY

Sept. 17, 1963  P. T. KAESTNER ET AL  3,104,348
DIFFERENTIAL MOTOR DRIVE FOR RATE DETERMINING SYSTEM
Filed July 1, 1957  3 Sheets-Sheet 2

INVENTORS
PAUL T. KAESTNER
BY FRED B. MacLAREN

*Louis L. Gagnon*
ATTORNEY

Sept. 17, 1963  P. T. KAESTNER ET AL  3,104,348
DIFFERENTIAL MOTOR DRIVE FOR RATE DETERMINING SYSTEM
Filed July 1, 1957  3 Sheets-Sheet 3
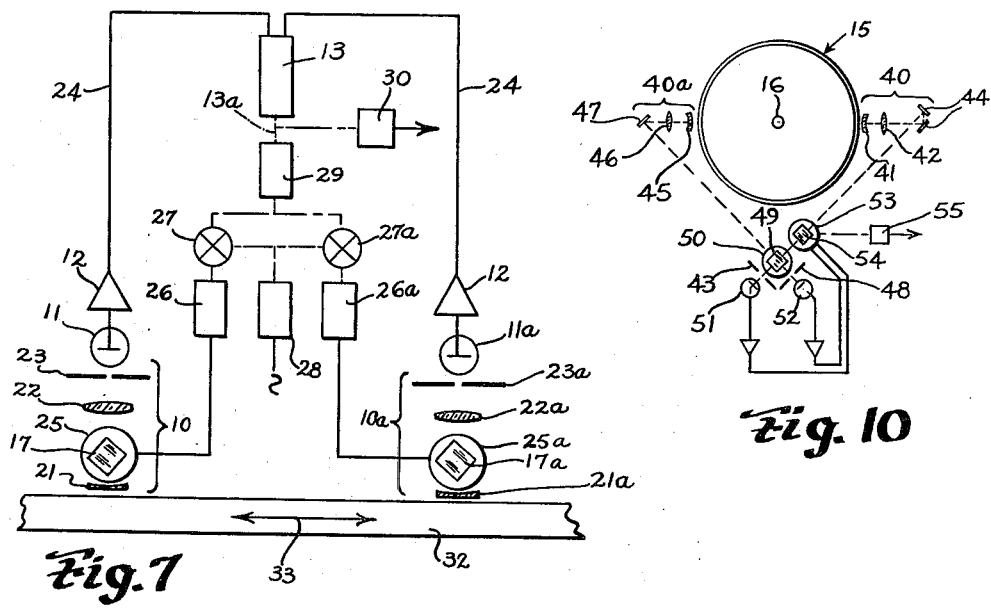
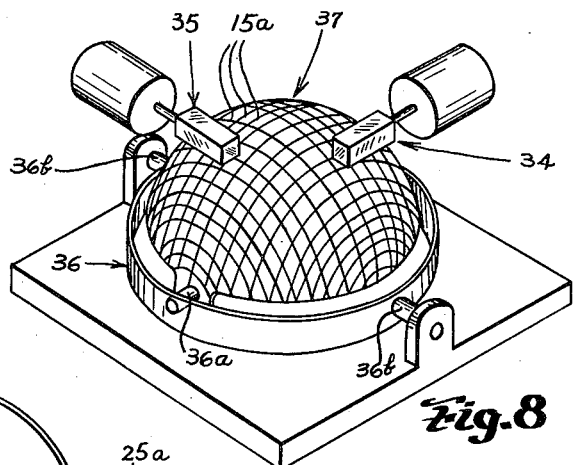
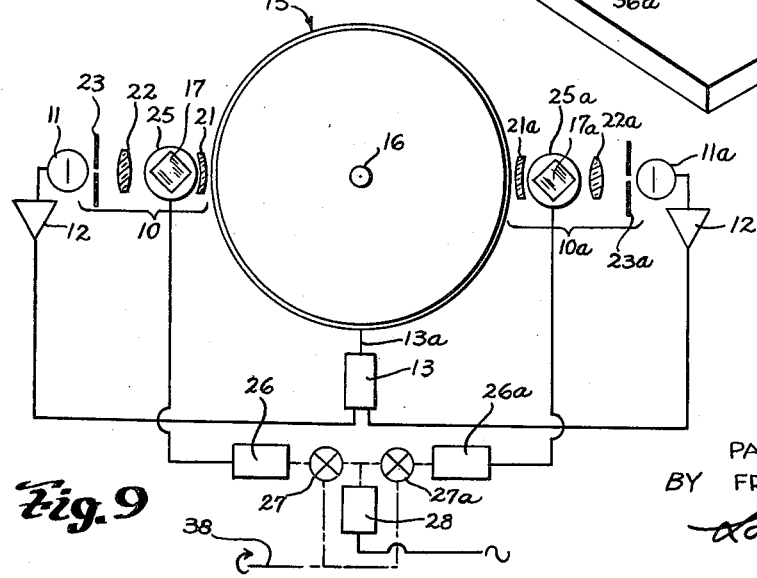
INVENTORS
PAUL T. KAESTNER
BY FRED B. MacLAREN
Louis L. Gagnon
ATTORNEY

United States Patent Office 3,104,348
Patented Sept. 17, 1963

3,104,348
DIFFERENTIAL MOTOR DRIVE FOR RATE
DETERMINING SYSTEM
Paul T. Kaestner, Pittsburgh, Pa., and Fred B. MacLaren,
Huntington, N.Y., assignors to J. W. Fecker, Inc., Pittsburgh, Pa., a corporation of Pennsylvania
Filed July 1, 1957, Ser. No. 669,295
13 Claims. (Cl. 318—13)

This invention relates to scanning devices and more particularly to means and method for procuring rate information from moving objects.

A principal object of the present invention is to provide novel means and method for scanning moving objects to obtain rate information therefrom.

Another object is to provide an improved highly accurate means and method for measuring the positions of moving members or precisely controlling the motion of such members.

Another object is to provide novel means for determining the rate of travel of moving objects by electro-optically producing a movement directly proportional to the movement of said objects and resolving certain rate information from said movement.

Another object is to provide an improved optical scanning means and electro-mechanical interpreting means associated therewith for providing a movement accurately proportional to the movement of an object in motion whereby the scanning means will produce a variable light flux pattern modified in accordance with the rate of travel of said moving object and said interpreting means will convert said light flux pattern into electrical energy for operating said interpreting means at a rate accurately proportional to the rate of travel of said moving object.

Another object is to provide improved apparatus for counting, recording, printing or storing rate information with regard to a moving object under observation wherein said apparatus embodies at least one movable optical means for scanning said moving object to produce a light flux pattern characterized by the relative movement between said object and said optical means, photoelectric means for transforming said light flux pattern into alternating electrical current which is phase shifted in accordance with variations in the characteristics of said light flux pattern, motion-imparting means electrically associated with said photoelectric means and responsive to the phase shifting of said electrical current for transforming the characteristics of said electrical current into readily interpretable mechanical motion and electro-mechanical feed back means between said movable optical means and motion-imparting means for stabilizing the movement of said optical means so as to cause movement of the object under observation to be interpreted by the action of said motion-imparting means.

Another object is to provide improved precision means and method of determining acceleration or deceleration rates of moving objects under observation.

A further object is to provide a novel feed-back system for a device of the above character which is relatively free of gear and gear noise errors which have heretofore been troublesome in such applications as sound recording and gyro test equipment.

A still further object is to provide relatively simple, highly efficient precision means for obtaining rate information from moving objects under observation, accurately locating said objects or, through corrective action, controlling the rate of travel thereof.

Other objects and advantages of the invention will become apparent from the following description when taken in conjunction with the accompanying drawings in which:

FIG. 7 is a diagrammatic illustration of the device of the invention as adapted for use with linearly moving objects;

FIG. 8 is a diagrammatic illustration of the device of the invention as adapted for use with objects having compound movements;

FIG. 9 is a view generally similar to FIG. 1 which illustrates an alternative use for the device of the invention and;

FIG. 10 is a diagrammatic illustration of a modified form of the device of FIG. 1 which is adapted for use with rotatable objects.

Figure 1:
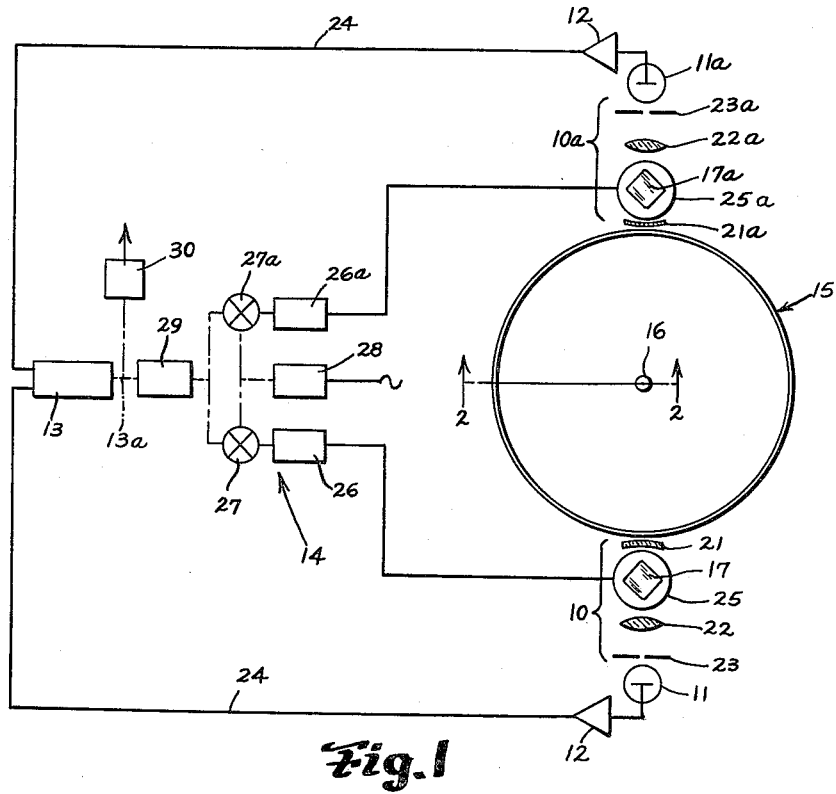
FIG. 1 is a diagrammatic illustration of the device embodying the invention as adapted for use with rotatable objects.

Referring more particularly to the drawings wherein like characters of reference designate like parts throughout the various views thereof, it is pointed out that the solid lines represent electrical connections and the dot-dash lines represent mechanical connections. The device embodying the invention comprises a pair of optical scanning units 10, 10a and photosensitive means 11, 11a each adapted to function in conjunction with a respective one of the scanning units to produce an electric signal from light being directed through said scanning units. Power amplifiers 12 of known type are provided for amplifying said signals and an interpreting means in the form of a two phase inductive type alternating current servo motor 13 is electrically connected with amplifiers 12 for receiving said amplified signals. An electro-mechanical compensating means 14, being interconnected with the motor 13 and scanning units 10, 10a, is adapted to operate said scanning units and regulate their scanning rate in accordance with the rate of travel of motor 13.

It is particularly pointed out that the device of the invention has numerous potential commercial adaptations such as, for example, a means for providing read-out data on rate tables, inertial test equipment tables, machine tools, or it may be used as a control device to accurately locate a member under observation. In the disclosure to follow, only the fundamental concepts of its various adaptations will be discussed, such as, its use as a means for measurement of rotational motion, linear motion or compound motions of objects under observations. Nevertheless, it is to be understood that while the various uses of the device are disclosed herein in a general manner for purposes of illustration only, many changes in the details of construction, arrangement of parts and method steps may be made for more specific adaptations of the device of the invention without departing from the spirit of the invention.

Particular reference is now made to FIG. 1 of the drawings wherein said device is employed in the measurement of a rotation about the axis of an object under observation. In this respect, a drum 15 is rigidly attached to a shaft 16, the rotation of which is to be measured. The surface of drum 15 is uniformly divided around its circumference in alternate light and dark parallel lines 15a, FIG. 2, which are illuminated by any suitable means, not shown. The illumination may be accomplished by reflecting light from the outer surface of drum 15 or by rendering the light lines 15a, translucent and projecting light through the same. An integral number of light and dark lines 15a are imaged through a pair of Anderson type prisms 17 and 17a, one in each of the scanning units 10 and 10a. Prisms 17 nad 17a are formed of glass of transparent plastic and are provided with an even number of faces located equiangularly thereon. In the present case, prisms 17 and 17a are illustrated as being four-sided and when rotated, cause the lines 15a to appear to move laterally in the direction of rotation of said prisms due to the refracting effect of the prism material. This effect is diagrammatically illustrated in FIGS. 3, 4 and 5, wherein plan views of one of the prisms is shown. For purposes of illustration, a few of the lines 15a on drum 15 have been numbered 1 through 8 and with prism 17 in a position such as shown in FIG. 3, it can be seen that substantially no refraction of the image-forming light rays 18 passing through said prism will take place. Thus, with drum 15 stationary, the images of lines 15a will appear in the same order (1 through 8) when projected through the prism 17. However, as prism 17 is rotated in the direction of arrow 19, FIG. 4, the image-forming light rays 18 will be refracted by said prism so as to cause the images of lines 15a to be moved laterally in the direction indicated by arrow 20. Further rotation of prism 17, FIG. 5, then causes the images of lines 15a to move further in the direction of arrow 20 and when revolved 45°, to the position of FIG. 5, the images will assume a related position indicated by 5, 6, 7; 8 and 1 combined; and 2, 3, 4 as illustrated. Rotation of prism 17, throughout another 45° will cause the images of lines 15a to again assume the position 1 through 8 as shown in FIG. 3. Continued rotation of prism 17 will cause the above cycle to be repeated over and over again to bring about the above-mentioned effect of moving the images laterally in the direction 20 of rotation of prism 17. Corrective lenses 21 and 21a are provided between drum 15 and their respective prisms 17 and 17a to modify the apparent position of the lines 15a on the drum 15 so as to compensate for the non-linearity of image lateral movement with uniform rate of prism rotation. Corrective lenses 21 and 21a may be further modified to compensate for other system distortions such as those caused by the curvature of the drum face.

Lenses 22 and 22a are provided at the opposed sides of prisms 17 and 17a to cause the images of lines 15a to be focused at scanning slits 23 and 23a respectively. Thus, with drum 15 stationary, the effect of rotating prisms 17 and 17a is to repeatedly produce a multiplicity of alternating light and dark lines at the scanning slits 23 and 23a. This provides a variable light flux passing through the slits which varies in accordance with the rate at which the images of lines 15a are presented at slits 23 and 23a. Photosensitive means 11 and 11a, such as the familiar photomultiplier tubes or the like, are each located behind one of the scanning slits 23 and 23a to convert the variable light flux passing through said slits into alternating electrical signals of frequencies proportional to the rate at which the prisms 17 and 17a are rotated. Movement of the drum 15 on which the light and dark lines 15a are provided, introduces a further movement of the images at each of the slits 23 and 23a which is added or subtracted from the movement caused by rotation of prisms 17 and 17a, depending upon the related directions of movement. Therefore, if the prisms 17 and 17a are rotated in opposite directions so as to produce identical frequencies of alternating signal from their respective phototubes, it is evident that any rotational movement of the drum 15 will produce a corresponding increase in the frequency of one signal and decrease in the frequency of the other.

In order to interpret this difference in signal frequency, each of the signals are amplified to a required power level by amplifiers 12 and fed into the field coils of the two phase inductive type alternating current servo motor 13 by electrical conductors 24. By electrically connecting motor 13 in the manner illustrated in the drawings, motor 13 will operate as a phase sensitive motor. However, a connection between the two amplifiers, 12, not shown on FIGURE 1, may be employed to provide means for rejection of the reference phase vector in the amplifier which provides power to the control windings of the servo motor. This allows the servo motor to operate as a conventional 2 phase, voltage controlled servo motor rather than as a phase sensitive motor. Motor 13 will characteristically remain stationary when the electrical currents of the two signals are of the same frequency and in phase with each other. However, as the drum 15 is rotated, one of the signals will be increased in frequency and the other decreased in frequency and thereby cause a phase shift in the current received at the field coils of motor 13 which will characteristically cause motor 13 to operate and rotate its drive shaft 13a in accordance with the phase shift.

The rotation of prisms 17 an 17a is accomplished by mechanically attaching said prisms to the shafts of conventional synchro receivers 25 and 25a respectively which are electrically connected to, and follow the rotation of synchro transmitters 26 and 26a. Receivers 25, 25a and transmitters 26, 26a are preferably of the self-synchronous type of electric motors such as the commercially available "Selsyn" motors, manufactured by General Electric Company. Transmitters 26 and 26a are, in turn, driven through mechanical differentials 27 and 27a respectively by a constant speed motor 28. The above prism drive arrangement then permits the synchro transmitters 26 and 26a, differentials 27 and 27a, and constant speed motor 28 to be located at a position remote from the synchro receivers 25 and 25a and prisms 17, 17a primarily for reasons of convenience. In certain applications of the device, however, it may be desirable to replace the mechanical differentials 27 and 27a with synchro differentials or to eliminate the synchros completely and drive the prisms 17 and 17a by direct mechanical linkage. Moreover, in cases where large accelerations of drum 15 exist, the synchro drives may not be rigid enough, thus, synchro control transformers and servo loops could be substituted for the synchro receivers 25 and 25a.

Returning now to the servo motor 13 which was said to rotate in response to movement of drum 15, it is evident that in order to maintain the speed of rotation of the servo motor 13 directly proportional to the speed of rotation of drum 15, a compensating means such as 14 must be provided to modify the speed of rotation of prisms 17 and 17a in accordance with the rotation of servo motor 13. A change in the speed of rotation in drum 15 produces a phase shift between the voltages produced at photosensitive means 11 and 11a. This phase shift causes the servo motor, 13, to increase its speed until the frequencies produced at photosensitive means 11 and 11a are again matched. Accordingly, each time the electrical signals from phototubes 11 and 11a are phase shifted, it is necessary to again bring the phototube signals back into phase with each other by modifying the speed of rotation of prisms 17 and 17a respectively. This modification of the speed of rotation of prisms 17 and 17a is brought about by the compensating means 14 which is electro-mechanically coupled between the shaft 13a of servo motor 13 and the prism drive synchro transmitters 26 and 26a.

Compensating means 14 comprises a gear train 29 mechanically coupled to shaft 13a of servo motor 13. The output of gear train 29 is then mechanically coupled to each of the differentials 27 and 27a so that rotational movement of shaft 13a will, through gear train 29, be transmitted to each of the differentials 27 and 27a and transmitters 26 and 26a. Directions of rotation of the gearing 29 and differentials 27 and 27a are chosen so as to increase the speed of rotation of one prism and decrease the speed of rotation of the other as a function of the servo motor rotation and these rotational directions are further chosen so as to make the changes in prism rotational speed act to cancel the phase shift in the two phototube signals.

From the above, it can be seen that each time the rotational speed of shaft 16 and drum 15 changes, the electrical signals from phototubes 11 become phase shifted, and cause servo motor 13 to rotate, which rotation is fed back through compensating means 14 to cause the signals from phototubes 11 to again assume an in-phase condition. This feed-back system then effectively causes the speed of rotation of the servo motor 13 to be controlled proportional to any changes in the speed of rotation of drum 15 or shaft 16. By a choice of gear ratios of the gear train 29, any ratio of servo motor shaft speed to drum speed may be established.

By providing a tachometer, pulsating device, analog to digital converter or other transducer 30 and operatively connecting same to the servo motor shaft 13a, means for counting, recording, printing or storing the rate information desired may be provided.

It is particularly pointed out that the device of the invention, being extremely sensitive in nature, provides a precision means for obtaining rate information from moving objects under observation particularly when the dual optical scanning units 10, 10a, FIG 1, are used at diametrically opposed sides of drum 15. In such a case, errors due to eccentricity of drum 15 with respect to the axis of rotation of shaft 16, on which it is mounted, are nullified since an eccentricity error would act to either proportionately advance or retard both phototube electrical signals simultaneously and thus produce no effect on the servo motor shaft. Furthermore, due to the multiplicity of lines involved in the scanning, an averaging effect occurs which reduces non cumulative errors in the angular positioning of the lines 15a on drum 15.

Figure 6:
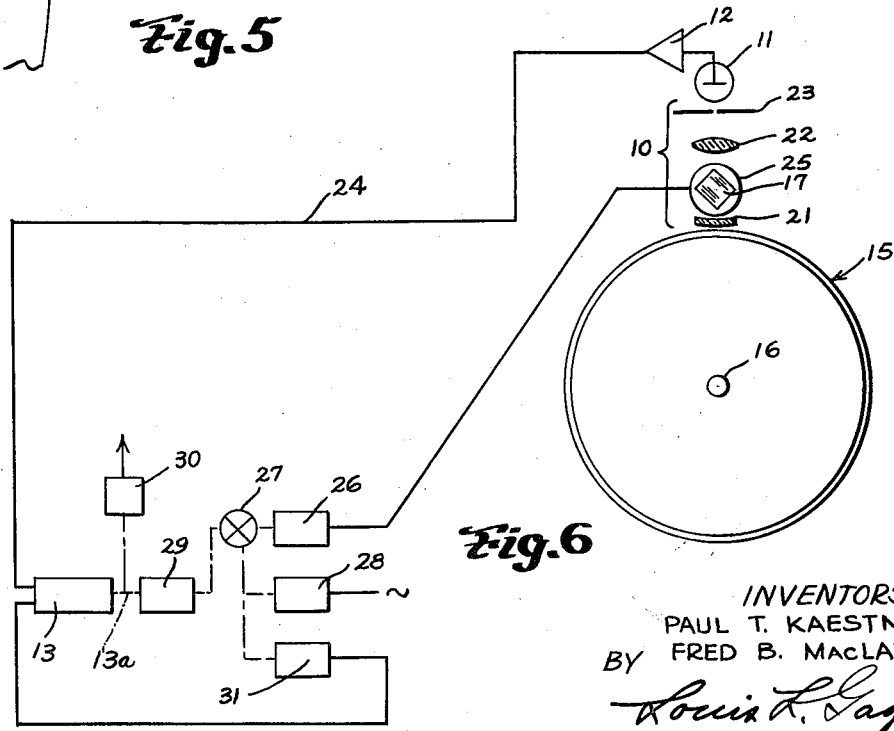
FIG. 6 is a diagrammatic illustration of a modification of the device shown in FIG. 1.

In instances where the ultimate accuracy of the dual optical scanning system of FIG. 1 is not required, a less complex form of the invention such as illustrated in FIG. 6 is used. The arrangement of FIG. 6 which requires the use of only one optical scanning unit operates in a manner generally similar to that of FIG. 1. The difference lies in the manner in which the field coils of servo motor 13 are energized. In this case, the control of the frequency of the electrical current supply to one field coil of the servo motor 13 is provided by the single optical scanning unit and phototube precisely as described above for FIG. 1 and the second field coil of servo motor 13 is energized by a fixed frequency. The fixed frequency is provided by a tachometer 31 driven by the constant speed synchronous motor 28. The second field coil could alternatively be supplied by any suitable source of power which is synchronous with respect to the constant speed synchronous motor 28. A change in the frequency of the signal from the single phototube of FIG. 6 will, when combined with the fixed frequency from tachometer 31 cause a resultant phase shifting of the electrical signals at the field coils of servo motor 13 and thus cause shaft 13a to rotate and operate the transducer or the like 30. Otherwise, the device of FIG. 6 will operate precisely as that of FIG. 1.

FIG. 7 illustrates the device of the invention as being used to measure linear motion in which case the object 32 being observed may be moved in either of the directions indicated by arrows 33 which movement will be recorded by the rotation of shaft 13a of servo motor 13 in exactly the same manner as described above for FIG. 1. In order to produce the alternating current signals from phototubes 11, 11a, the alternate dark and light lines 15a are provided on the moving member 32 and are disposed longitudinally in directions normal to the direction of movement 33 thereof and are scanned by the prisms 17 and 17a which are rotated in opposite directions. Translation of the moving member by scanning units 10, 10a provides a phase shift in both of the signals from the phototubes 11, 11a one lagging and the other leading to produce the rotation of servo motor shaft 13a. The feed-back for modifying the speed of rotation of prisms 17 and 17a, in accordance with the rotation of shaft 13a, is effected in the manner described for the rotary drum application of FIG. 1. A single scanning unit and associated control means may also be used for linear motion scanning in a manner analogous to that utilized by the drum application of FIG. 6.

In the case of measuring or providing follow-up data pertaining to compound motions, two independently controlled scanning systems 34 and 35 may be used, as diagrammatically shown in FIG. 8. In such an application, the dark and light lines 15a which provide the signals for the two scanning systems are concentric with the pivotal axes 36a and 36b of the gimbal 36 and intersect each other at right angles. The gimbal 36 provides the means for producing a compound motion to a spherical member 37 to be measured. In the interest of simplifying the illustration of FIG. 8 only a single scanning prism oriented in the direction of each axis 36a and 36b is shown. It is to be understood, however, that when reference is made hereinafter to a "scanning system" it is meant one complete single system such as shown in FIG. 6 or alternatively, one complete dual scanning system such as shown in FIGS. 1 or 7 are used.

The scanning system 34 of FIG. 8 is adapted to interpret the movement of member 37 about its pivot means 36a and scanning system 35 is adapted to interpret the movement of member 37 about its pivot means 36b. In keeping with the disclosure of the previously described scanning systems, it is pointed out that each of the scanning systems 34 and 35 employ the use of a two-phase inductive type alternating current servo motor for providing a movement proportional to the movement of member 37 in a particular direction. That is, a servo motor in system 34 will rotate in accordance with the movement of member 37 about pivot means 36a and a servo motor in system 35 will rotate in accordance with the movement of member 37 about pivot means 36b. By attaching a suitable transducer to the shafts of said servo motors, means may be provided for recording, transmitting or otherwise analyzing rate information with regard to the movement of member 37. It is pointed out that a particular application of the arrangement of FIG. 8 might be that of a fire control stable element when used in conjunction with gyro equipment. While the scanning lines 15a of member 37 are in crossed relation with each other, the lines for the use of one scanning system do not affect the other scanning system since the scanning slit of each scanning system would be of a length several times the apparent spacing of the lines 15a and thus no appreciable change in light level could result in the introduction of a false signal.

Although the means for introducing the above-described compound motion has been shown and described as being for a spherical member 37 which is mounted upon a gimbal 36, it is obvious that compound motions of a flat object being movable in a single plane could be measured in exactly the same manner as described for the apparatus of FIG. 8. In such a case, the target lines 15a would be arranged parallel to each of the major meridians of the flat object and the scanning systems 34 and 35 would be located adjacent the target lines in precisely the manner diagrammatically illustrated for FIG. 8.

FIG. 9 is provided to illustrate a modification of the arrangement shown in FIG. 1 wherein the device of the invention is used to directly control the rotation of drum 15 through the application of corrective action by the servo motor 13 on the drum itself rather than on the rotation of the prisms as described for FIG. 1. Motor 13 is mechanically coupled to drum 15 and acts as a motor drive for rotating drum 15. In this case, the reference source of rate information is applied to a feed-in shaft 38. Rotation of shaft 38, which is mechanically coupled to differentials 27, 27a then causes drum 15 to rotate in accordance with the rotation of shaft 38. That is, drum 15 and shaft 16 will rotate in accordance with the reference rate of rotation which is applied to shaft 38. With shaft 38 held stationary, it can be seen that the constant speed motor 28 will drive prisms 17 and 17a at a constant rate through differentials 27 and 27a, synchro transmitters 26 and 26a and synchro receivers 25. By so driving each of the prisms 17 and 17a at a constant rate and rotating same in directions opposite to each other in a manner analogous to that of FIG. 1, the signals produced by phototubes 11, 11a will be of the same frequency and in phase with each other and thus cause no rotation of motor 13. Drum 15, in this case, being driven by shaft 13a of motor 13, will remain stationary. However, by rotating shaft 38 which is mechanically coupled to differentials 27 and 27a, the speed of rotation of one prism will be increased while the speed of rotation of the other prism is correspondingly decreased. This alteration in the speeds of prisms 17 and 17a will then cause phototubes 11, 11a to produce electrical signals which differ in frequency and when fed into motor 13 cause a resultant phase shifted signal to produce rotation of motor 13, shaft 13a and drum 15 being attached thereto. It can then be seen that the rotation of drum 15 and shaft 16 will be proportional to the rotation of feed-in shaft 38. Since the feed-back reference signal is derived from the rotation of the drum itself by the optical scanning means 10, 10a and with no mechanical linkage between the drum and feed-back system, this arrangement is relatively free of gear and gear noise errors which have heretofore been troublesome in such application as sound recording and gyro test equipment where mechanical feed-back arrangements are used.

It is pointed out that the apparatus of FIG. 9 need not be restricted in use to the controlling of rotatable objects. Such an apparatus may be readily adapted to control the lineal movement of an object by simply connecting the shaft 13a of motor 13 to any known means such as a rack and pinion or the like for moving an object linearly and by arranging the optical scanning units 10, 10a in a manner similar to that illustrated in FIG. 7.

Figure 2:
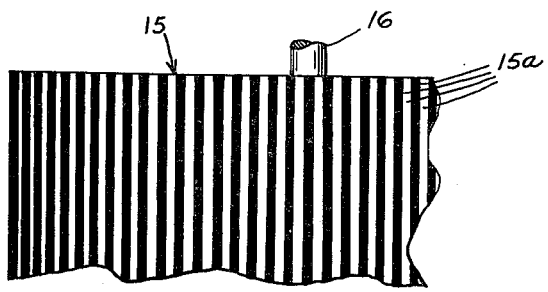
FIG. 2 is an enlarged fragmentary elevational view of a part of the device taken substantially on lines 2—2 of FIG. 1.
Figure 3:
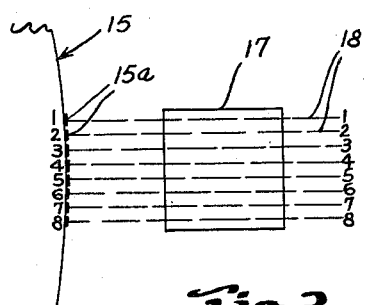
FIGS. 3, 4 and 5 are diagrammatic illustrations of the refracting effect produced upon image-forming light rays when passed through one of the rotary prism parts of the optical system of the device.
Figure 4:
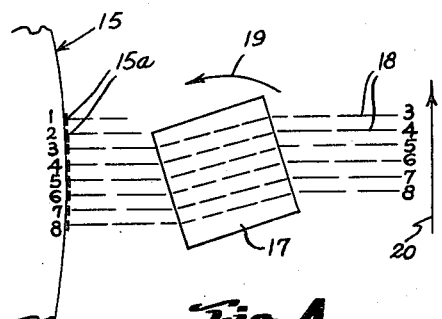
Figure 5:
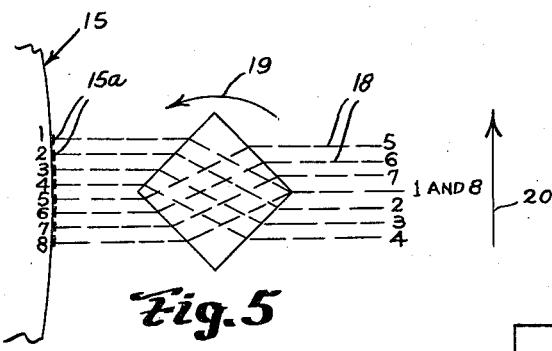

The apparatus of FIG. 10 which is shown as being adapted to measure the rotation of a shaft 16, is provided with drum 15 having illuminated dark and light target lines around its circumference in the manner precisely as shown and described for FIGS. 1 and 2. The device of FIG. 10, however, differs from that of FIG. 1 in that the diametrically opposed sides of drum 15 are scanned simultaneously by a common scanning means. In this manner, the scanning of each side of drum 15 may be accomplished in synchronism without the use of the above described differentials 27, 27a and gear train 29 of FIG. 1. To accomplish this, a pair of optical units 40 and 40a are located in diametrically opposed relation with drum 15. Unit 40 embodies a corrector lens 41 which is similar in character and function to lens 21 of FIG. 1 and an objective lens 42 of a predetermined focal length for imaging the target lines on drum 15 at a slit 43. Intermediate the slit 43 and objective 42 are positioned a pair of plane surfaced mirrors 44 for folding the image forming light rays from lens 42 and causing the same to be directed to the scanning slit 43. The optical unit 40a is generally similar to unit 40 in that it embodies a corrector lens 45, an objective lens 46 and a plane mirror 47 for folding the image forming light rays from lens 46 and causing same to be imaged at a scanning slit 48. It will be noted that the optical paths of the image forming light rays from units 40 and 40a intersect each other at a point in front of and adjacent the scanning slits 43 and 48 and are at right angles to each other at said point of intersection. The above mentioned common scanning means is positioned at the point of intersection of the optical paths and comprises an Anderson type prism 49 whose axis of rotation is axially aligned with said point of intersection of the optical paths. Thus, with prism 49 in a position such as illustrated in FIG. 10, it can be seen that the image forming light rays from units 40 and 40a will enter said prism in a direction normal to its respective faces and pass through the same to be imaged at their respective slits 43 and 48. Prism 49 is rotatably mounted on a constant speed motor 50, which is similar in character to the previously described motor 28 of FIG. 1, and rotation of prism 49 by motor 50 will introduce an apparent motion to the images of the target lines at scanning slits 43 and 48. This apparent motion of the images of the target lines is brought about in the manner disclosed above for prism 17 wherein FIGS. 3, 4 and 5 illustrate this effect.

It is particularly pointed out that in order to cause the apparent motion of the target images at slits 43 and 48 to move in directions opposite to each other when using the single or common scanning prism 49, it is essential to optically reverse the direction at which one of the images is received by the prism 49. This is accomplished by using an odd number of plane mirrors in the optical paths from units 40 and 40a. Thus it can be seen that the use of the single mirror 47 in unit 40a and the double mirrors 44 in unit 40 will accomplish this result. Rotation of prism 49 in one direction will then cause the images of the target lines passing through prism 49 to move in directions opposite to each other at slits 43 and 48.

Phototubes 51 and 52 are provided adjacent the respective slits 43 and 48 to convert the variable light flux passing through said slits into alternating electric current signals in the manner previously discussed with relation to phototubes 11 and 11a of FIG. 1.

With drum 15 stationary, rotation of the common scanning prism 49 will cause phototubes 51 and 52 to each produce an alternating electric current signal, each being in phase with the other and of the same frequency. Rotation of drum 15, however, will cause the frequency of one signal to be increased and the frequency of the other signal decreased proportionally due to the above mentioned reversal of the images which is brought about by the related arrangement of mirrors 44 and 47.

In order to compensate for the difference in frequency of the signals from phototubes 51 and 52 the feed back means of FIG. 10 which comprises a two phase alternating current servo motor 53 which is electrically connected to phototubes 51 and 52 and which responds only to a phase difference in the electrical signals received therefrom. Rotation of drum 15 which alters the frequencies of the signals from phototubes 51 and 52 then produces a resultant phase difference or shift in the electric current as received by motor 53 and causes rotation of same.

In order to modify the signals produced by phototubes 51 and 52 in accordance with the rotation of motor 53 so as to again bring said signals into phase with each other and of the same frequencies, a second Anderson prism 54 is mounted on motor 53 so as to be rotatable therewith. Prism 54 is further positioned so as to intercept the optical path between optical unit 40 and prism 49. Rotation of prism 54 by the motion of motor 53 introduces an apparent motion to the image forming light passing therethrough which in combination with the motion introduced by prism 49 through which said light rays also pass will either increase or decrease the rate at which said light rays are scanned at slit 43 depending upon whether or not the prism 54 is rotated in the same direction or in a direction opposite the direction of rotation of prism 49. In this manner the related direction of rotation of the prisms is so controlled that the signals from phototubes 51 and 52 will be brought into phase with each other. It can then be seen that the action of motor 53 is similar to motor 13 of FIG. 1 and its speed of rotation is proportional to that of drum 15. The prism 54 attached to motor 53 in this case provides the feed back means for cancelling any existing differences in the frequencies of the signals from phototubes 51 and 52.

A means for recording, printing or otherwise transducing the rate information desired is accomplished by attaching a tachometer, pulsating tachometer, analog to digital converter or other transducer 55 to the operating shaft of motor 53.

It is particularly pointed out that in order to produce an in focus condition of the images of the target lines at the scanning slits 43 and 48, the focal lengths of lenses 41 and 46 are controlled in accordance with index of refraction of the prisms 49 and 54 through which said images are projected in order to bring about this result. If it is desired to locate a drum 15 on a shaft or platform which is remote from the remaining apparatus of the invention, such as in the case of firing platforms for missiles where it would be desirable to control the operation of said platforms from a remote location the optical elements of the scanning units would be arranged to provide extended optical paths from said platforms to said remote location.

Resolution of the read out data obtained from transducer 55 is primarily a function of the maximum rates to be applied to drum 15 and the operating speed of motor 53 caused by the rotation of drum 15 at said maximum rates. By providing a choice of speed ratios between motor 53 and scanner rotated by motor 50, higher resolution at slow rates is made available. Thus, it can be seen that the maximum operating speed of motor 53 in r.p.m. divided by the corresponding maximum drum 15 speed in degrees per minute provides a measure of the number of motor 53 shaft rotations per degree of drum 15 rotation.

From the foregoing, it can be seen that simple, improved, and economical means and method have been provided for obtaining all the objects and advantages of the invention and the invention is not to be limited to the exact matters shown and described as said matters are given by way of illustration only.

Having described our invention, we claim:

1. Apparatus for determining rate information from moving objects under observation comprising target means movable with an object under test, means for producing a pair of electrical signals, one of said means embodying electro-optical scanning means adjacent said target means for interpreting the movement of said target means and object and producing an electrical signal which is characterized by the related movement between said target and scanning means, motion-imparting means associated with said scanning means and adapted to receive said pair of electrical signals, said motion-imparting means being adapted to react to characteristic differences in the signals of said pair wherein said differences are brought about by the relative movement between the target and scanning means, and compensating means interconnected between said scanning means and motion-imparting means for controlling the rate of scanning of said scanning means in accordance with the reaction of said motion-imparting means.

2. Apparatus of the character described comprising target means associated with an object and movable therewith, at least one optical scanning means in alignment with said target means, a movable refracting element in said optical scanning means to produce light flux patterns characterized by the target means and the relative movement between said refracting element and object under test, means for producing a pair of alternating electric current signals embodying at least one photoelectric means associated with said optical scanning means for converting said light flux patterns into alternating electrical current which is frequency modulated in accordance with variations in the characteristics of said light flux patterns, motion-imparting means electrically associated with said photoelectric means and adapted to receive said pair of electric current signals, at least one of which is produced by the photoelectric means, said motion-imparting means being responsive only to a resultant phase shifting of said electric current signals produced by any existing differences in the frequencies thereof and further being adapted to transform the phase shifting characteristics of said electrical current into readily interpretable mechanical motion.

3. Apparatus for determining the rate of travel of moving objects under observation comprising target means associated with an object and movable therewith, at least one optical scanning means in optically aligned relation with said target means, a movable refracting element in said optical scanning means to produce light flux patterns characterized by the target means and the relative movement between said refracting element and object, means for producing a pair of alternating electric current signals embodying at least one photoelectric means associated with said optical scanning means for converting said light flux patterns into alternating electrical current which is frequency modulated in accordance with variations in the characteristics of said light flux patterns, motion-imparting means electrically associated with said photoelectric means and adapted to receive said pair of electric current signals at least one of which is produced by the photoelectric means, said motion-imparting means being responsive only to a resultant phase shifting of said electric current signals produced by any existing differences in the frequencies thereof and further being adapted to transform the phase shifting characteristics of said electrical current into readily interpretable mechanical motion, electro-mechanical feedback means interconnected between said movable refracting element and motion-imparting means for stabilizing the movement of said refracting element in accordance with said resultant phase shifting of said pair of signals.

4. A device for determining rate information from moving objects under observation comprising target means associated with an object under test and movable therewith, movable optical scanning means for producing a variable light flux pattern characterized by the relative movement between said target and scanning means, means for producing a pair of electric current signals embodying at least one photoelectric means associated with said scanning means for converting said light flux pattern into at least one alternating electric current signal which is frequency modulated in accordance with variations in the characteristics of said light flux pattern, electric motor means connected with said photoelectric means and energized by said pair of alternating electric current signals, said motor means being responsive only to a difference in the frequencies of said pair of signals and adapted to produce a mechanical motion in response to said frequency difference, electro-mechanical feed-back means interconnected between said motor means and movable optical scanning means for stabilizing the movement of said scanning means in accordance with the mechanical motion imparted by said motor means so as to cause only a rate change in movement of the object under observation to be transposed into mechanical motion by the motor means and means coupled with said motor means for converting said mechanical motion of the motor means into readily interpretable rate information.

5. Apparatus for measuring rotational movement of objects under test comprising a cylindrical target means concentrically related with the axis of rotation of a rotatable object to be tested, said target means being fixed to rotate with said object, an optical scanning unit at each side of said target means in diametrically opposed relation with each other for forming images of said target means, a rotatable refracting element in each of said optical units for introducing an apparent motion to the images of the target means projected therethrough when said refracting elements are rotated, said images being in the form of variable light flux patterns, photoelectric means associated with each of said optical scanning units for converting said light flux patterns of each of said scanning units into separate alternating electric current signals, means for rotating said refracting elements in opposite directions to each other and at controlled equal rates to cause said signals to be of equal frequencies and in phase with each other when said target means is stationary, motion-imparting means electrically connected with said photoelectric means and responsive only to a resultant phase shifting of the electric current received from said signals whereby rotation of the object under test and the target means will cause an increase in the frequency of one signal and a corresponding decrease in the frequency of the other signal to produce a phase shifting of the resultant electric current received by said motion-imparting means, compensating means interconnected between said motion-imparting means and rotatable refracting elements, said compensating means being responsive to the motion produced by said motion-imparting means and adapted to adjust the rotation of said refracting elements accordingly.

6. Apparatus for measuring rotational movement of objects comprising a cylindrical target means concentrically related with the axis of rotation of a rotatable object and said target means being fixed to rotate with said object, an optical scanning unit at one side of and adjacent said target means for producing an image of said target means, a rotatable refracting element in said optical unit for introducing an apparent motion to said image of the target means when said refracting element is rotated, said image being in the form of a variable light flux pattern, photoelectric means associated with said optical scanning unit for converting said light flux pattern into a first alternating electric current signal, separate means for producing a second alternating current electric signal of a predetermined frequency, means for rotating said refracting element at a controlled rate to cause said first signal to be equal in frequency and in phase with said second signal when said target means is stationary, motion-imparting means electrically connected with said photoelectric means and said separate means for producing a second signal and responsive only to a resultant phase shifting of the electric current received thereby from said first and second signals whereby rotation of the object under test and the target means will cause a change in the frequency of said first signal to produce a phase shifting of the resultant electric current received by said motion-imparting means, compensating means interconnected between said motion-imparting means and rotatable refracting element, said compensating means being responsive to the motion produced by said motion-imparting means and adapted to adjust the rotation of said refracting element accordingly.

7. Apparatus for measuring the lineal movement of objects under test comprising an elongated target means fixed to move with an object under test, a pair of spaced optical scanning units adjacent one side of said target means for producing images of said target means, a rotatable refracting element in each of said optical units for introducing an apparent motion to said images of the target means when said refracting elements are rotated, said images being in the form of variable light flux patterns at the image planes of said optical scanning units, photoelectric means for converting said light flux patterns of each of said scanning units into separate alternating electric current signals, means for rotating said refracting elements in opposite directions to each other and at controlled equal rates to cause said signals to be of equal frequencies and in phase with each other when said target means is stationary, motion-imparting means electrically connected with said photoelectric means and responsive only to a resultant phase shifting of the electric current received from said signals whereby movement of the object under test and the target means will cause an increase in the frequency of one signal and a corresponding decrease in the frequency of the other signal to produce a phase shifting of the resultant electric current received by said motion-imparting means, compensating means interconnected between said motion-imparting means and rotatable refracting elements, said compensating means being responsive to the motion produced by said motion-imparting means and adapted to adjust the rotation of said refracting elements accordingly.

8. Apparatus for controlling the positioning of movable objects comprising target means being movable with an object to be positioned, image-forming optical scanning means adjacent said target means, at least one rotatable refracting element in said optical scanning means for introducing an apparent motion to the image of the target means formed thereby when said refracting element is rotated, said image being in the form of a variable light flux pattern, means for producing a pair of electric signals embodying at least one photoelectric means associated with said optical scanning means for converting said light flux pattern into at least one alternating electric current signal, means for rotating said refracting element at a predetermined constant rate to produce an electric current signal of a predetermined frequency, further means for varying said constant rate of rotation of said refracting element by desired amounts in accordance with the extent of movement desired of the object to be positioned, motion-imparting means mechanically connected with said object to be positioned and energized by said pair of alternating electric current signals, at least one of said signals being from said photoelectric means, said motion-imparting means being responsive only to a resultant phase shifting of the electric current received from said pair of signals whereby a variation of said constant rate of rotation of said refracting element by operation of said mentioned further means therefor will cause a difference in the frequencies of said pair of signals to produce a phase shifting of the resultant electric current received by said motion-imparting means to cause a movement thereof directly proportional to the variation of said constant rate of rotation of said refracting element and thus cause said object to be positioned to move proportionately therewith.

9. Apparatus for measuring compound movements of movable objects under test comprising target means movable with an object under test, said target means having a series of alternate light and dark lines thereon arranged in parallel relation with each of the major meridians of movement of an object under test, at least a pair of optical scanning units adjacent said target means and each unit thereof being aligned with a respective one of said major meridians for producing an image of the light and dark lines of the target means which are aligned therewith, said images being in the form of variable light flux patterns, a rotatable optical element in each of said scanning units for introducing, when rotated, an apparent motion to the images of the target means formed by said scanning units, means for producing at least one pair of electric current signals from each of the optical scanning units embodying at least one photoelectric means adjacent each of said scanning units for converting said light flux patterns formed by rotation of the respective optical units into at least one alternating electric current signal from the image of each of said scanning units, means for rotating said optical elements at controlled rates to cause said electric signals to be of known frequencies when the object under test is stationary, motion-imparting means electrically connected to each of said photoelectric means and each responsive to one of said pairs of electric signals, at least one of said signals to each of the motion-imparting means being received from a respective photoelectric means, each of said motion-imparting means being adapted to introduce mechanical motion only in response to a resultant phase shifting of its respective pair of signals whereby movement of said object under test in the directions of either of its major meridians will cause the light flux patterns associated therewith to alter the known frequencies of at least one of the signals to a respective motion-imparting means and thus cause a phase shifting of a respective pair of signals thereto so as to cause said motion-imparting means to introduce a corresponding mechanical motion, compensating means electro-mechanically coupling each of said motion-imparting means with a respective rotatable optical element to adjust the rotation thereof in accordance with the mechanical motion of its respective motion-imparting means.

10. A device for determining rate information from moving objects comprising target means associated with an object and movable therewith, movable optical scanning means for producing a variable light flux pattern characterized by the relative movement between said target and scanning means, means for producing a pair of electric current signals embodying at least one photoelectric means associated with said scanning means for converting said light flux pattern into at least one alternating electric current signal which is frequency modulated in accordance with variations in the characteristics of said light flux pattern, electric motor means connected with said photoelectric means and energized by said pair of alternating electric current signals, said motor means being responsive only to a difference in the frequencies of said pair of signals and adapted to produce a mechanical motion in response to said frequency difference, optical feed back means rotatable at a rate proportional to said motor means and disposed in optically aligned relation with said movable optical scanning means for altering the variable light flux pattern an amount in accordance with the motion of said motor means so as to cause the movement of the object under observation to be transposed into mechanical motion by the motor means and means coupled with said motor means for converting said mechanical motion of the motor means into readily interpretable rate information.

11. Apparatus of the character described comprising means for producing a light pattern of alternate light and dark areas, said light pattern being movable in synchronism with the movement of an object under test, electro-optical means for repeatedly continuously scanning said light pattern at a controlled rate and converting light energy from the same into alternating electric current whose frequency is controlled in accordance with said rate of scanning and characteristically changed in accordance with variations in the movement of said object relative to said scanning means, electro-mechanical interpreting means associated with said scanning means for receiving said alternating electric current and converting said characteristic changes therein into mechanical motion.

12. Apparatus of the character described comprising means for producing a light pattern of alternate light and dark areas, said means being movable in synchronism with the movement of an object, electro-optical means for repeatedly continuously scanning said light pattern at a predetermined rate and converting light energy from said pattern into at least one alternating electric current signal of a frequency which is modulated in accordance with said rate of scanning and characteristically changed from said modulated frequency in accordance with variations in the movement of said object relative to said scanning means, electro-mechanical interpreting means adapted to receive said signal and convert only said characteristic changes in said electric signal into mechanical motion.

13. A method comprising moving a light flux in synchronism with the movement of a movable object, scanning said light flux at a controlled rate during said synchronous movement and causing said scanned light flux to impinge upon means adapted to produce an electric current having characteristics controlled by the related movement of said light flux and said object, interpreting changes in said characteristics as introduced by said related movement of said light flux and object, and converting said changes in said characteristics into motion which is proportional to said changes.

References Cited in the file of this patent

UNITED STATES PATENTS

| | | |
|---|---|---|
| 2,361,973 | Smith | Nov. 7, 1944 |
| 2,437,048 | Salles | Mar. 2, 1948 |
| 2,720,798 | Roth | Nov. 13, 1956 |
| 2,786,973 | Kutzler | Mar. 26, 1957 |

FOREIGN PATENTS

| | | |
|---|---|---|
| 682,863 | Great Britain | Nov. 19, 1952 |